(12) United States Patent
Park et al.

(10) Patent No.: US 12,379,856 B2
(45) Date of Patent: Aug. 5, 2025

(54) STORAGE DEVICE FOR STORING WRITE DATA OR READING READ DATA AND ELECTRONIC DEVICE INCLUDING THE SAME

(71) Applicant: SK hynix Inc., Icheon-si (KR)

(72) Inventors: Ie Ryung Park, Icheon-si (KR); Dong Sop Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 26 days.

(21) Appl. No.: 17/979,189

(22) Filed: Nov. 2, 2022

(65) Prior Publication Data
US 2023/0136664 A1 May 4, 2023

(30) Foreign Application Priority Data

Nov. 2, 2021 (KR) .................. 10-2021-0149196
Oct. 14, 2022 (KR) .................. 10-2022-0131883

(51) Int. Cl.
*G06F 3/06* (2006.01)
(52) U.S. Cl.
CPC .......... *G06F 3/0625* (2013.01); *G06F 3/0659* (2013.01); *G06F 3/0673* (2013.01)
(58) Field of Classification Search
CPC ..... G06F 3/0625; G06F 3/0659; G06F 3/0673
See application file for complete search history.

(56) References Cited

U.S. PATENT DOCUMENTS

| | | | |
|---|---|---|---|
| 10,275,378 B2* | 4/2019 | Benisty | G06F 13/28 |
| 2016/0170850 A1* | 6/2016 | Williams | G06F 3/064 |
| | | | 714/6.23 |
| 2020/0192735 A1* | 6/2020 | Ioannou | G06F 3/064 |
| 2020/0241799 A1* | 7/2020 | Kanno | G06F 3/064 |

FOREIGN PATENT DOCUMENTS

KR 10-2019-0069966 A 6/2019

* cited by examiner

*Primary Examiner* — Mark A Giardino, Jr.
(74) *Attorney, Agent, or Firm* — Perkins Coie LLP

(57) ABSTRACT

A storage device includes: a memory device; and a memory controller configured to receive, from an external device having an external memory, a write command for storing data in the memory device and address information of an area in the external memory that corresponds to the write command, and acquire write data from the external device based on the address information. The memory controller may be further configured to store the write data in the memory device in response to the write command. The memory controller may be further configured to acquire a portion of the write data from the external memory upon a failure of storage of the portion of the write data in the memory device, and provide a response to the write command to the external device after completing storing of the write data in the memory device.

14 Claims, 16 Drawing Sheets

FIG. 11

| Cmd | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Trans. 1 | 1 | 2 | 3 | 4 | 5 | 6 | 7 | 8 | 9 | 10 | | | | | | |
| Trans. 2 | 11 | 12 | 13 | 14 | | | | | | | | | | | | |
| Trans. 3 | 15 | 16 | | | | | | | | | | | | | | |
| Trans. 4 | 4 | 5 | 6 | 7 | 12 | 16 | | | | | | | | | | |
| Trans. 5 | 6 | | | | | | | | | | | | | | | | ial
STORAGE DEVICE FOR STORING WRITE DATA OR READING READ DATA AND ELECTRONIC DEVICE INCLUDING THE SAME

CROSS-REFERENCE TO RELATED APPLICATION

The present application claims priority under 35 U.S.C. § 119(a) to This patent document claims priority to and benefits of the Korean patent application number 10-2021-0149196, filed on Nov. 2, 2021 and Korean patent application number 10-2022-0131883, filed on Oct. 14, 2022, which are incorporated herein by reference in its entirety.

TECHNICAL FIELD

The present disclosure generally relates to a storage device and an electronic device.

BACKGROUND

In volatile memory devices such as a DRAM, all stored information is erased at the same time when power is off. On the other hand, in nonvolatile memory devices, stored information is retained even when power is off. Accordingly, the nonvolatile memory devices are necessaries of portable digital products which should be operated in a state in which a certain amount of information is stored. For example, in the case of a PC using a DRAM, necessary information should be stored in a hard disk when power is to be off during an operation. However, 'bulky' hard disks cannot be used for portable products having 'compactness and lightness' as competitiveness. Therefore, competitiveness of nonvolatile memories has recently been connected to competitiveness of mobile products (e.g., memory cards, digital cameras, voice/audio recorders, networking, cellular phones, or others).

On demand for these nonvolatile memories, optimized memory controllers are required. In particular, memory controllers are required, which can further improve the performance and power efficiency of storage devices including nonvolatile memories and further reduce the areas of the storage devices.

SUMMARY

Embodiments of the disclosed technology provide a storage device and an electronic device, which can further improve the performance and power efficiency of the storage device and further reduce the area of the storage device.

In accordance with an aspect of the present disclosure, there is provided a storage device including: a memory device; and a memory controller configured to receive, from an external device having an external memory, a write command for storing data in the memory device and address information of an area in the external memory that corresponds to the write command, and acquire write data from the external device based on the address information, wherein the memory controller is further configured to: store the write data in the memory device in response to the write command; and acquire a portion of the write data from the external memory upon a failure of storage of the portion of the write data in the memory device and provide a response to the write command to the external device after completing storing of the write data in the memory device.

In accordance with another aspect of the present disclosure, there is provided a storage device including: a memory device; and a memory controller configured to receive, from an external device having an external memory, a read command for reading data from the memory device and address information of an area in the external memory that corresponds to the read command, and read data from the memory device in response to the read command, wherein the memory controller is further configured to: provide the read data to the external device based on the address information; and read a portion of the read data from the memory device upon a failure in providing the read data to the external device, and provide a response to the read command to the external device after completing providing of the read data to the external device.

In accordance with still another aspect of the present disclosure, there is provided an electronic device including: a host device including a host memory and a host controller for controlling the host memory; and a storage device in communication with the host device and including a memory device and a memory controller, wherein the memory controller is configured to receive, from the host device, a command for performing an operation on the memory device to write or read data and address information of an area in the host memory that corresponds to the command, access the host memory based on the address information, and control the memory device to perform the operation corresponding to the command, wherein the memory controller is further configured to: perform the operation on the memory device; and acquire a portion of the data upon an failure in performing the operation, and provide a response to the command to the host device after completing the performing of the operation.

BRIEF DESCRIPTION OF THE DRAWINGS

Example embodiments will now be described in more detail hereinafter with reference to the accompanying drawings. The disclosed technology may be embodied in different forms and should not be construed as limited to the embodiments set forth herein.

In the drawing figures, dimensions may be exaggerated for clarity of illustration. Like reference numerals refer to like elements throughout.

FIG. 11 is a diagram illustrating a data transferring and receiving process of an electronic device in accordance with an embodiment of the disclosed technology.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
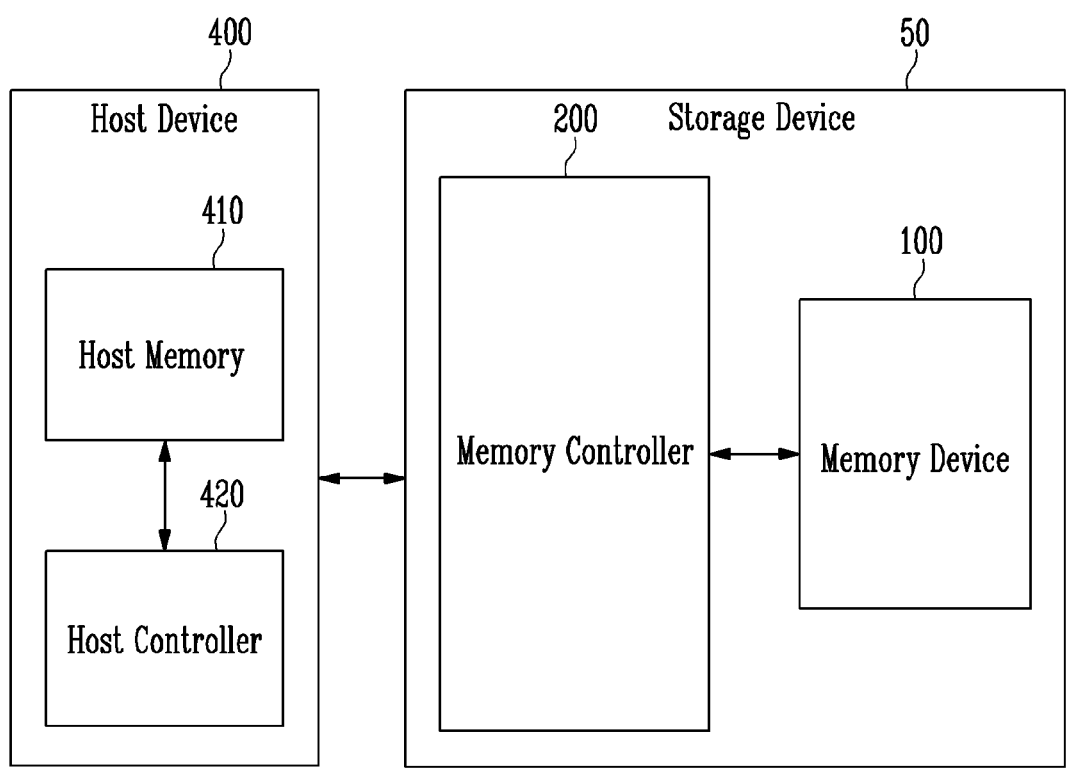
FIG. 1 is a diagram illustrating an electronic device in accordance with an embodiment of the disclosed technology.

FIG. 1 is a diagram illustrating an electronic device in accordance with an embodiment of the present disclosure.

Referring to FIG. 1, the electronic device may include a storage device 50 and a host device 400.

The storage device 50 may include a memory device 100 and a memory controller 200. The storage device 50 may be a device for storing data based on the control of the host device 400, such as a mobile phone, a smart phone, an MP3 player, a laptop computer, a desktop computer, a game console, a TV, a tablet PC or an in-vehicle infotainment system. Alternatively, the storage device 50 may be a device for storing data based on the control of the host device 400 for storing high-capacity data in one place, such as a server or a data center.

The storage device 50 may be manufactured as any one of various types of storage devices according to a host interface that is a communication scheme with the host device 400. For example, the storage device 50 may be configured with any one of a variety of types of storage devices, such as an SSD, a multimedia card in the form of an MMC, an eMMC, an RS-MMC and a micro-MMC, a secure digital card in the form of an SD, a mini-SD and a micro-SD, a Universal Serial Bus (USB) memory module, a Universal Flash Storage (UFS) device, a personal computer memory card international association (PCMCIA) card type memory module, a peripheral component interconnection (PCI) card type memory module, a PCI express (PCI-E) card type memory module, a Compact Flash (CF) card, a Smart Media Card (SMC), and a memory stick.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 may be operated based on the control of the memory controller 200. The memory device 100 may include a memory cell array (not shown) including a plurality of memory cells for storing data.

Each of the memory cells may be configured as any one of a Single Level Cell (SLC) storing one data bit, a Multi-Level Cell (MLC) storing two data bits, a Triple Level Cell (TLC) storing three data bits, and a Quadruple Level Cell (QLC) storing four data bits.

The memory cell array (not shown) may include a plurality of memory blocks. Each memory block may include a plurality of memory cells. Each memory block may include a plurality of pages. In an embodiment, the page may be a unit for storing data in the memory device 100 or reading data stored in the memory device 100. The memory block may be a unit for erasing data.

In an embodiment, various memory devices such as a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), or a Spin Transfer Torque Random Access Memory (STT-RAM) may be applied as the memory device 100. In this specification, for convenience of description, a case where the memory device 100 is a NAND flash memory is described as one example. In some implementations, the memory device 100 can be implemented as various memory device without being limited to the NAND flash memory.

The memory device 100 may receive a command and an address from the memory controller 200, and access an area selected by the address in the memory cell array. The memory device 100 may perform an operation indicated by the command on the area selected by the address. For example, the memory device 100 may perform a write operation (program operation), a read operation, and/or an erase operation. In the program operation, the memory device 100 may program data in the area selected by the address. In the read operation, the memory device 100 may read data from the area selected by the address. In the erase operation, the memory device 100 may erase data stored in the area selected by the address.

The memory controller 200 may control overall operations of the storage device 50.

When power is applied to the storage device 50, the memory controller 200 may execute firmware (FW). When the memory device 100 is a flash memory device, the memory controller 200 may execute FW such as a flash translation layer (FTL) for controlling communication between the host device 400 and the memory device 100.

The memory controller 200 may receive, from the host device 400, address information at which an operation requested according to a request is to be performed and address information of an area in the host device 400 corresponding to the requested operation. In an embodiment, the memory controller 200 receive a Logical Address (LA) at which an operation is to be performed, which is input from the host device 400, and convert the LA into a Physical Address (PA) representing an address of memory cells in the memory device 100, at which data is to be stored or at which data is to be read. Also, in an embodiment, the memory controller 200 may access a specific position in the host device 400, based on the address information of the area in the host device 400, which is received from the host device 400, thereby receiving data from the specific position or storing data at the specific position.

The memory controller 200 may control the memory device 100 to perform a program operation, a read operation, or an erase operation according to a request or a command of the host device 400. In this specification, a request or a command, which is transferred between the storage device 50 and the host device 400, may be used as the same meaning. In the program operation, the memory controller 200 may provide a program command, a PA, and data to the memory device 100. In the read operation, the memory controller 200 may provide a read command and a PA to the memory device 100. In the erase operation, the memory controller 200 may provide an erase command and a PA to the memory device 100.

After completing a program operation, a read operation, an erase operation, or others on the memory device 100 according to a request of the host device 400, the memory controller 200 may provide the host device 400 with a response to the request of the host device 400. Thus, before completing the operation on the memory device 100, the memory controller may not provide the host device 400 with the response to the request of the host device 400. In some implementations, when a fail occurs in storing data in the memory device 100, the memory controller 200 may request the data in which the fail occurs from the host device 400.

In an embodiment, the memory controller 200 may generate a command, an address, and data independently of any request from the host device 400, and transfer the command, the address and the data to the memory device 100. For example, the memory controller 200 may provide the memory device 100 with a command, an address, and data, which are used to perform read and program operations accompanied in performing wear leveling, read reclaim, garbage collection, or others.

In an embodiment, the memory controller 200 may control at least two memory devices 100. The memory controller 200 may control the memory devices 100 according to an interleaving scheme so as to improve operational performance. The interleaving scheme may be a scheme for controlling operations on at least two memory devices 100 to overlap with each other.

The host device 400 may include a host memory 410 and the host controller 420.

The host device 400 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), or a Load Reduced DIMM (LRDIMM).

The host memory 410 may be configured to temporarily store a command, data, and others, which are to be transferred to storage device 50 from the host controller 420.

Also, the host memory 410 may be configured to temporarily store a response received from the storage device 50. The host memory 410 may be a random access memory such as a dynamic random access memory (DRAM) or a static random access memory (SRAM), but the present disclosure is not particularly limited thereto. In an example, the host memory 410 may include a volatile memory such as a Static Random Access Memory (SRAM), a Dynamic RAM (DRAM), or a Synchronous DRAM (SDRAM), or various nonvolatile memories such as Phase-change RAM (PRAM), a Magneto-resistive RAM (MRAM), a Resistive RAM (ReRAM), and a Ferro-electric RAM (FRAM). The host memory 410 may be accessed by the memory controller 200 of the storage device 50 in addition to the host controller 420. A partial area of the host memory 410 may be a host buffer memory area (not shown) which the memory controller 200 can use as a buffer memory. The host memory 410 may temporarily store data to be stored in the memory device 100 or data read from the memory device 100.

The host controller 420 may be configured to control a general operation of the host device 400. Although not shown in FIG. 1, the host controller 420 may include one or more central processing units (CPUs).

The host controller 420 may generate a command to be provided to the storage device 50. The host controller 420 may provide the generated command directly to the storage device 50, or store the generated command in the host memory 410 and then request the storage device 50 to receive the generated command. The host controller 420 may provide the storage device 50 with the command together with address information at which an operation requested with a request is to be performed and address information of an area in the host device 400 corresponding to the requested operation.

The host controller 420 may access the host memory 410 to store, read, and/or erase data. When the host controller 420 receives a response to a write request from the storage device 50, the host controller 420 may erase, from the host memory 410, write data, which has been stored in the host memory 410. The write data corresponds to data provided to the storage device 50 together with the write request.

When storage of a portion of write data in the memory device 100 fails, the portion of write data may be referred to as the failed write data. In the occurrence of the failure of storing the portion of write data, the host device 400 may provide the storage device 50 with failed write data stored in the host memory 410. The storage device 50 may request the host device 400 to provide the failed write data and the host device 400 provides the failed write data in response to the request. The storage device 50 may directly access the host memory 410, thereby acquiring the failed write data.

When storage of a portion of read data according to a read request in the host memory 410 fails, the portion of read data may be referred to as the failed read data. In the occurrence of the failure of reading the portion of read data, the host device 400 may receive failed read data from the storage device 50. The host device 400 may request the storage device 50 to provide the failed read data and the storage device 50 provides the failed read data in response to the request. In some implementations, the storage device 50 may recognize the occurrence of the fail of reading the portion of read data and provide the failed read data to the host device 400 without the request from the host device 400.

Figure 2:
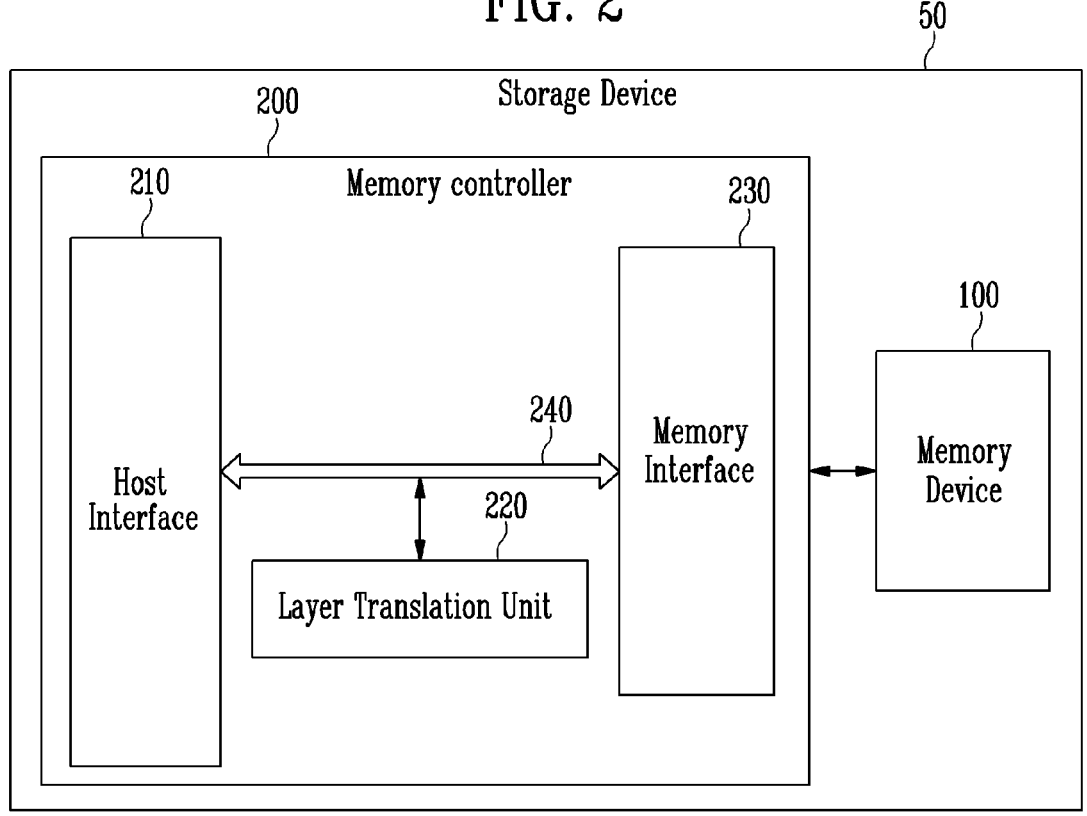
FIG. 2 is a diagram illustrating a storage device in accordance with an embodiment of the disclosed technology.

FIG. 2 is a diagram illustrating a storage device in accordance with an embodiment of the present disclosure.

Referring to FIGS. 1 and 2, the storage device 50 in accordance with the embodiment of the present disclosure may include a memory device 100 and a memory controller 200.

The memory device 100 may store data. The memory device 100 may be operated based on the control of the memory controller 200. The memory device 100 may include a memory cell array including a plurality of memory cells for storing data. The memory cell array may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data.

The memory controller 200 may include a host interface 210, a memory interface 230, and a layer translation unit 220.

The host interface 210 may be configured with firmware corresponding to a Host Interface Layer (HIL) for managing an interface with the host device 400 and hardware for implementing the firmware. The host interface 210 may provide the layer translation unit 220 with requests received from the host device 400. The host interface 210 may provide the host device 400 with a result obtained by executing the request received from the host device 400. The host interface 210 may directly access the host memory 410 in the host device 400.

The memory interface 230 may be configured with firmware corresponding a Memory Interface Layer (MIL) for managing an interface with the memory device 100 and hardware for implementing the firmware. The memory interface 230 may communicate with the memory device 100. The memory interface 230 may provide the memory device with commands corresponding to requests received from the layer translation unit 220. The memory interface 230 may receive a result of commands executed by the memory device 100. In an embodiment, the memory interface 230 does not pass through the host interface 210 but may directly access the host memory 410 in the host device 400, if necessary.

The layer translation unit 220 may be configured with firmware corresponding to a translation layer for managing a translation between the HIL and the MIL, such as a Flash Translation Layer (FTL), and hardware for implementing the firmware. The layer translation unit 220 may translate a logical address included in a request from the host device 400 into a physical address. In an embodiment, the physical address may be an address indicating a specific memory area included in a flash memory device.

In addition, the memory controller 200 may include a bus 240, and the bus 240 may be configured to provide a channel between components of the memory controller 200.

In an embodiment, based on address information of the area in the host device 400, which is received from the host device 400, the host interface 210 may receive data from a position represented by the address information or provide data to the position represented by the address information. The address information of the area in the host device 400 may represent a position in the host device 400, which corresponds to a command provided by the host device 400. For example, the position in the host device 400 may provide information at which write data is stored or at which read data is to be stored.

In an embodiment, when storage of a portion of write data fails while the memory interface 230 stores the write data in the memory device 100, the host interface 210 may request failed data from the host device 400. Accordingly, the host interface 210 may receive the failed data. Since the storage device 50 recognizes a position of the failed data in the host device 400 according to the address information of the position in the host device 400, which is received from the host device 50, the storage device 50 may provide the host device 400 with a command for requesting data by specifying the position of the failed data, or directly receive the data from the position of the failed data.

Figure 3:
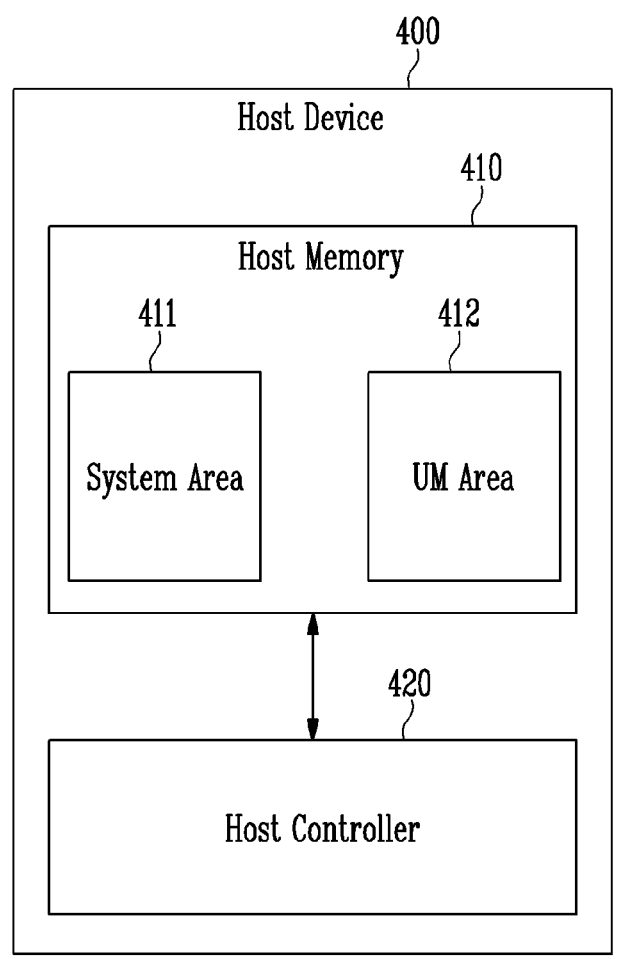
FIG. 3 is a diagram illustrating a host device in accordance with an embodiment of the disclosed technology.

FIG. 3 is a diagram illustrating a host device in accordance with an embodiment of the present disclosure.

Referring to FIGS. 1 and 3, the host device 400 may include a host memory 410 and a host controller 420. The host memory 410 may include a system area 411 which only the host controller 420 can access and a Unified Memory (UM) area 412 which the storage device 50 can access. The UM area 412 may be used as a kind of buffer memory. For example, in a write operation or a read operation on the storage device 50, transferred data may be temporarily stored in the UM area 412.

The host controller 420 may control the host memory 410. Also, the host controller 420 may communicate with the storage device 50.

In an embodiment, the host controller 420 may provide the storage device 50 with address information in the host memory 410, at which a write command and data corresponding thereto are stored. In an embodiment, the data may be located in the UM area 412 in the host memory 410, and the address information in the host memory 410 may be position information in the UM area 412. The storage device 50 may acquire write data from the host memory 410, based on the address information.

In an embodiment, the host controller 420 may provide the storage device 50 with address information of an area in the host memory 410, at which a read command and read data are to be stored. In an embodiment, the read data may be located in the UM area 412 in the host memory 410, and the address information of the position in the host memory 410 may provide information on a certain position in the UM area 412. The storage device 50 may provide the read data to the host memory 410, based on the address information.

In some implementations, the host memory 410 may be used as one of a buffer memory. Unlike the storage device 50, the host controller 420 and the host memory 410 in the host device 400 have little spatial limitation, and a hardware upgrade of the host controller 420 and the host memory is possible, if necessary. Thus, in order to improve the operational efficiency of the storage device 50, resources belonging to the host device 400 can be used. Accordingly, a case where a portion of the host memory is used as a buffer memory can be more effective than a case where a separate buffer memory is provided in the storage device or a case where the capacity of the buffer memory provided in the storage device is increased.

Figure 4:
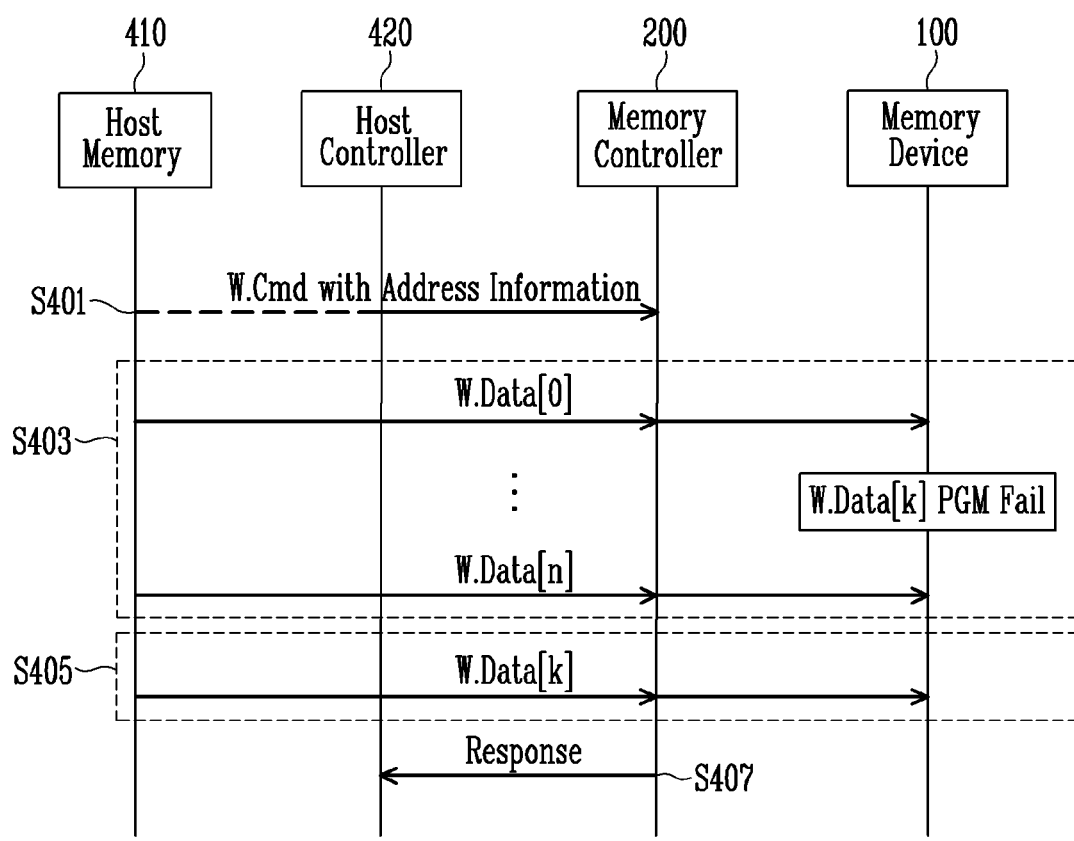
FIG. 4 is a flowchart illustrating a write operation of an electronic device in accordance with an embodiment of the disclosed technology.

FIG. 4 is a flowchart illustrating a write operation of the electronic device in accordance with an embodiment of the present disclosure.

Referring to FIGS. 1 and 4, in step S401, the host controller 420 may provide a write command to the memory controller 200. Address information in the host memory 410, which corresponds to the write command, i.e., address information in the host memory 410, at which write data is stored, may be provided together with the write command to the memory controller 200.

In step S403, the memory controller 200 may acquire the write data from the host memory 410, based on the received address information of an area in the host memory 410. The write data may be classified into one or more data sectors, W.Data[0] to W.Data[n], and be divided to a plurality of data packets. Each of the data packets may include one or more data sectors.

Assume that the storage of a partial data sector, W.Data[k], fails while the memory controller 200 stores the data sectors, W.Data[0] to W.Data[n], in the memory device 100. In this case, in step S405, the storage device 50 may receive failed data sector, W.Data[k], from the host memory 410 and store the failed data sector, W.Data[k], in the memory device 100.

When all the data sectors included in the write data is completely stored in the memory device 100, in step S407, the memory controller 200 may provide the host controller 420 with a response to the write command.

Figure 5:
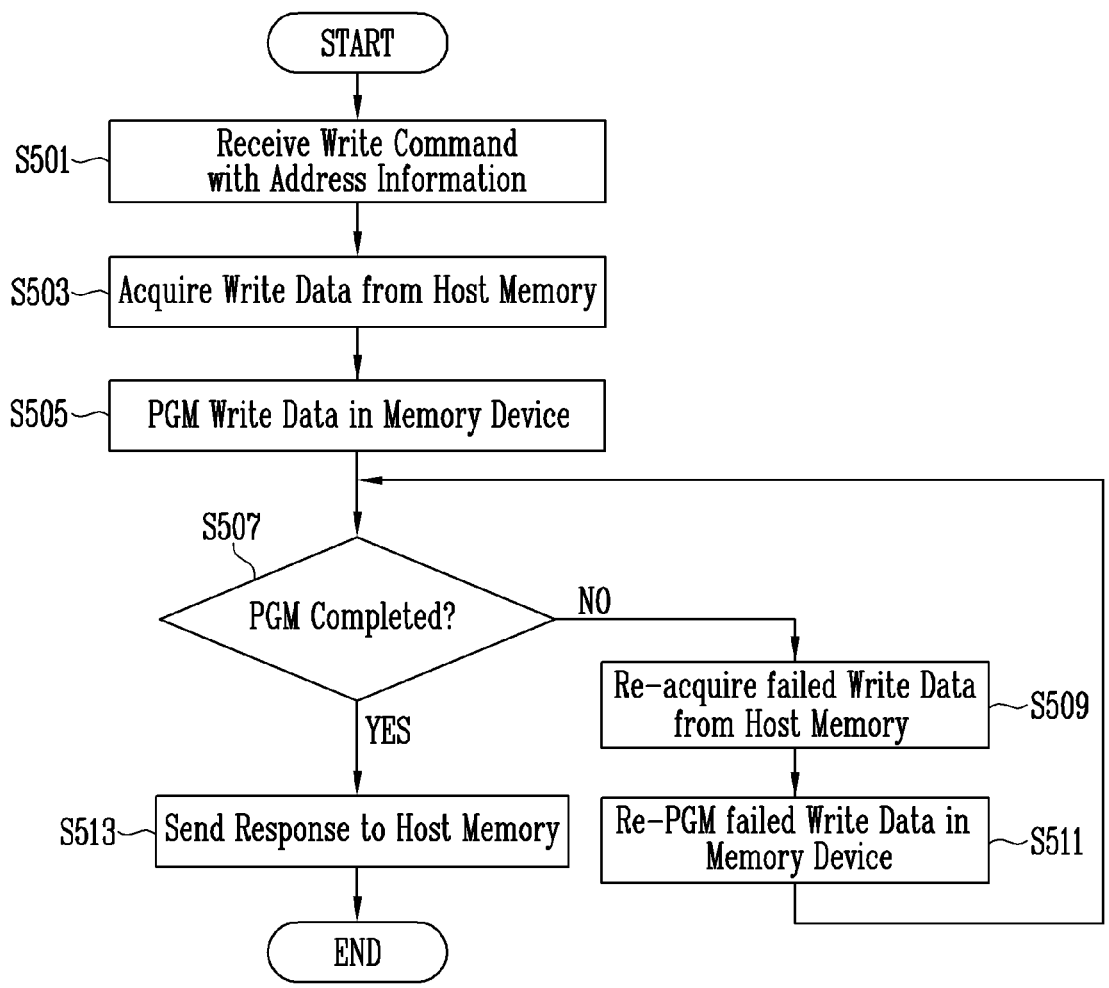
FIG. 5 is a flowchart illustrating a write operation of an electronic device from a viewpoint of the storage device in accordance with an embodiment of the disclosed technology.

FIG. 5 is a flowchart illustrating a write operation of the electronic device from a viewpoint of the storage device in accordance with an embodiment of the present disclosure.

Referring to FIGS. 1, 4, and 5, in step S501, the memory controller 200 may receive, from the host device 400, a write command and address information of an area in the host memory 410, which corresponds to the write command.

In step S503, the storage device 50 may acquire write data from the host memory 410, based on the address information in the host memory 410, which corresponds to the write command. In step S505, the acquired write data may be programmed in the memory device 100.

When the write data is not completely programmed and programming of a portion of the write data fails in step S507, in step S509, the storage device 50 may acquire failed write data from the host memory 410. The acquisition of the failed write data may be performed based on the address information received by the storage device 50 in the step S501. In step S511, the failed write data may be programmed in the memory device 100.

When all the write data is successfully programmed in the step S507, in step S513, the storage device 50 may provide a response to the host memory 410.

Figure 6:
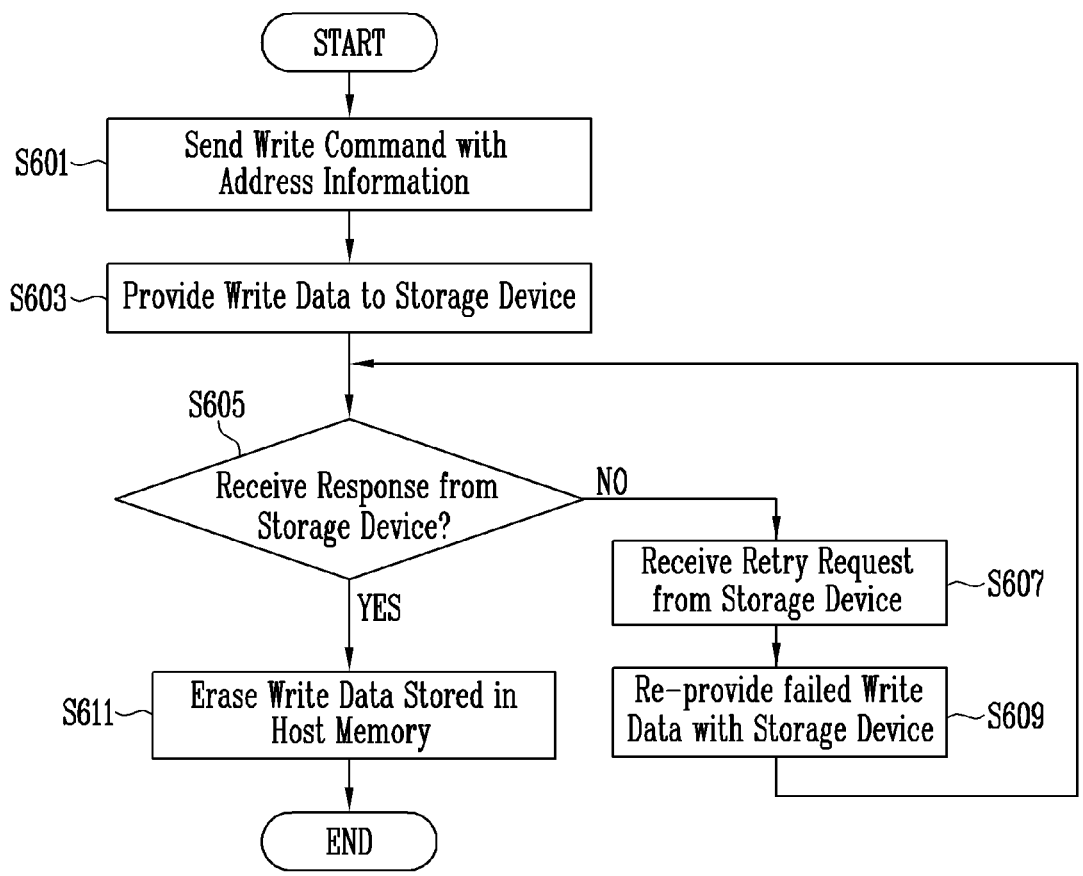
FIG. 6 is a flowchart illustrating a write operation of an electronic device from a viewpoint of a host device in accordance with an embodiment of the disclosed technology.

FIG. 6 is a flowchart illustrating a write operation of the electronic device from a viewpoint of the host device in accordance with an embodiment of the present disclosure.

Referring to FIGS. 1, 4, and 6, in step S601, the host controller 420 may provide the storage device with a write command and address information of an area in the host memory 410, which corresponds to the write command.

In step S603, the host device 400 may provide the storage device 50 with write data stored in the host memory 410. The step S603 may be performed using a method in which the host controller 420 provides the storage device 50 with the write data stored in the host memory 410 according to a request of the storage device 50 or a method in which the storage device 50 directly accesses the host memory 410, thereby acquiring the write data stored in the host memory 410.

When the host controller 420 does not receive a response from the storage device 50 in step S605, but receives information indicating that specific data is requested or information indicating that storage of a portion of the specific data has failed in step S607, in step S609, the host device 400 may provide the storage device 50 with failed write data stored in the host memory 410.

When the host controller 420 receives a response from the storage device 50 in the step S605, in step S611, the host controller 420 may erase the write data stored in the host memory 410.

In some implementations, since the host memory 410 maintains the write data until the host memory 410 receives a response to the storage device 50, and the storage device 50 provides a response to the host device 400 after all data is completely programmed, the write data may be stored in the host memory 410 until before all the data is completely programmed. Therefore, when programming of a portion of the write data fails while being programmed in the memory device 100, failed write data may be received from the host memory 410.

Figure 7:
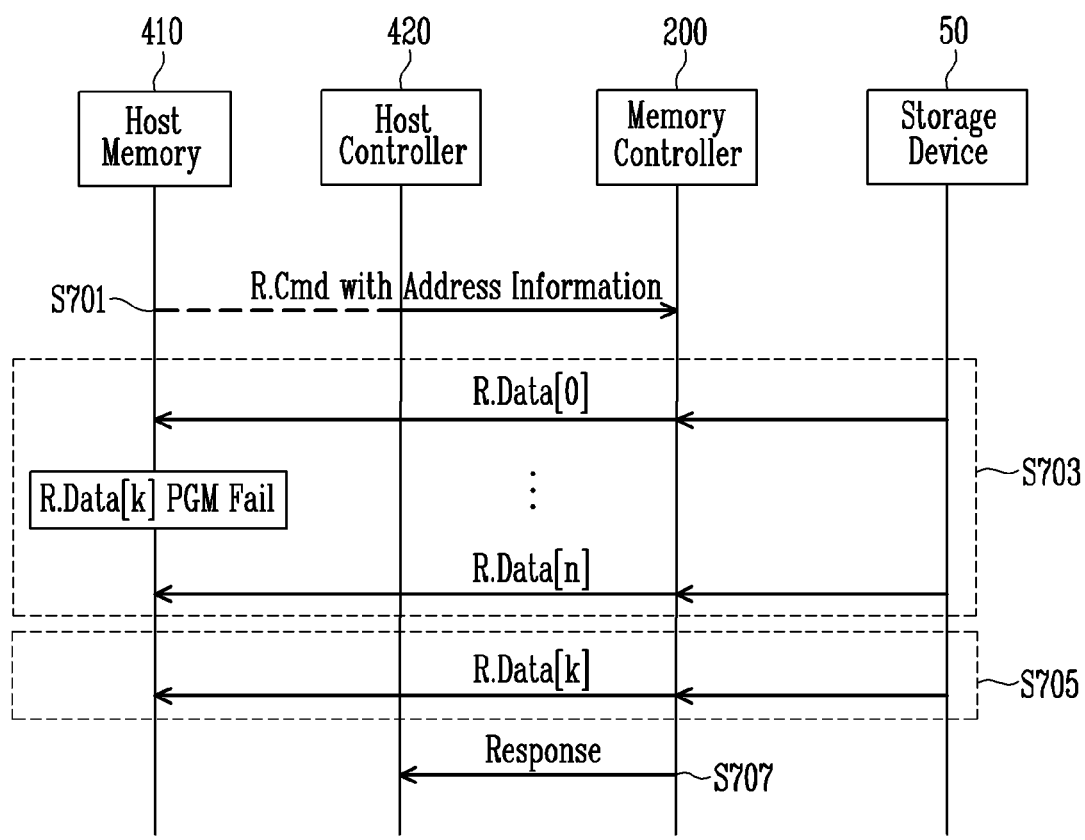
FIG. 7 is a flowchart illustrating a read operation of an electronic device in accordance with an embodiment of the disclosed technology.

FIG. 7 is a flowchart illustrating a read operation of the electronic device in accordance with an embodiment of the present disclosure.

Referring to FIGS. 1 and 7, in step S701, the host controller 420 may provide a read command to the memory controller 200. Address information in the host memory 410, which corresponds to the read command, i.e., address information of an area in the host memory 410, at which read data is to be stored, may be provided to the memory controller 200 together with the read command.

In step S703, the memory controller 200 may provide read data to the host memory 410, based on the received address information in the host memory 410. Thus, the read data may be stored in the host memory 410. The read data may be classified into one or more data sectors, R.Data[0] to R.Data[n], and be divided to a plurality of data packets. Each of the data packets may include one or more data sectors.

Assume that the storage of a partial data sector, R.Data[k], fails while the memory controller 200 provides the data sectors, R.Data[0] to R.Data[n], to the host memory 410, in step S705, failed data sector may be read from the memory device 100, so that the storage device 50 provides failed data sector, R.Data[k], to the host memory 410.

When all the data sectors included in the read data is completely stored in the host memory 410, in step S707, the memory controller 200 may provide the host controller 420 with a response to the read command.

Figure 8:
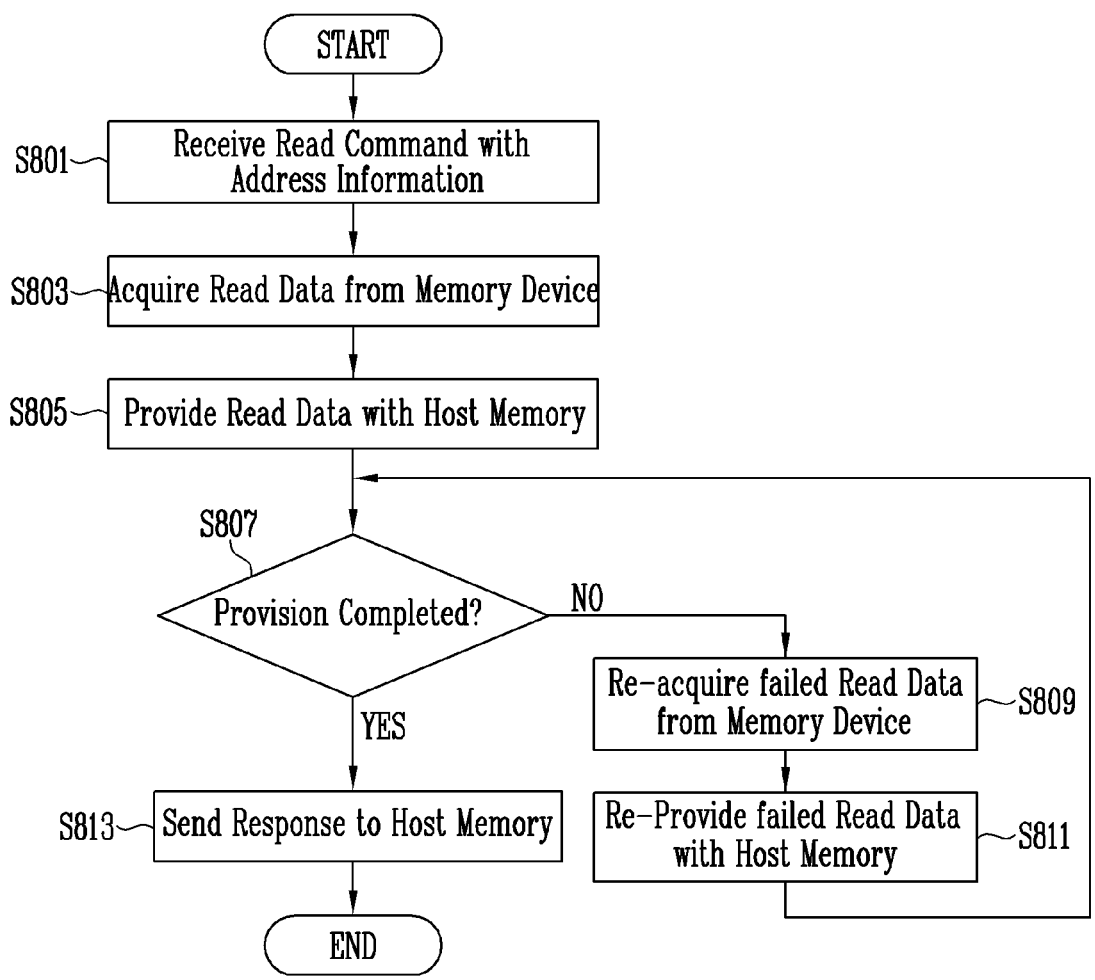
FIG. 8 is a flowchart illustrating a read operation of an electronic device from a viewpoint of a storage device in accordance with an embodiment of the disclosed technology.

FIG. 8 is a flowchart illustrating a read operation of the electronic device from a viewpoint of the storage device in accordance with an embodiment of the present disclosure.

Referring to FIGS. 1, 7, and 8, in step S801, the memory controller 200 may receive, from the host device 400, a read command and address information of an area in the host memory 410, which corresponds to the read command.

In step S803, the storage device 50 may acquire read data by reading data from the memory device 100. In step S805, the storage device 50 may provide the read data to the host memory 410, based on the address information in the host memory 410, which corresponds to the read command. Thus, the read data may be stored in the host memory 410.

When the read data is not completely provided to the host memory 410, but storage of a portion of the read data fails in step S807, in step S809, the storage device 50 may acquire failed read data from the memory device 100. In step S811, the failed read data may be provided to the host memory 410. A position at which the read data is to be stored in the host memory 410 may be determined based on the address information received by the storage device 50 in the step S801.

When all the read data is successfully provided to the host memory 410 in the step S807, in step S813, the storage device 50 may provide a response to the host memory 410. The storage device 50 may receive a signal indicating that the read data has been completely provided from the host device 400, or autonomously recognize that the read data has been completely provided.

Figure 9:
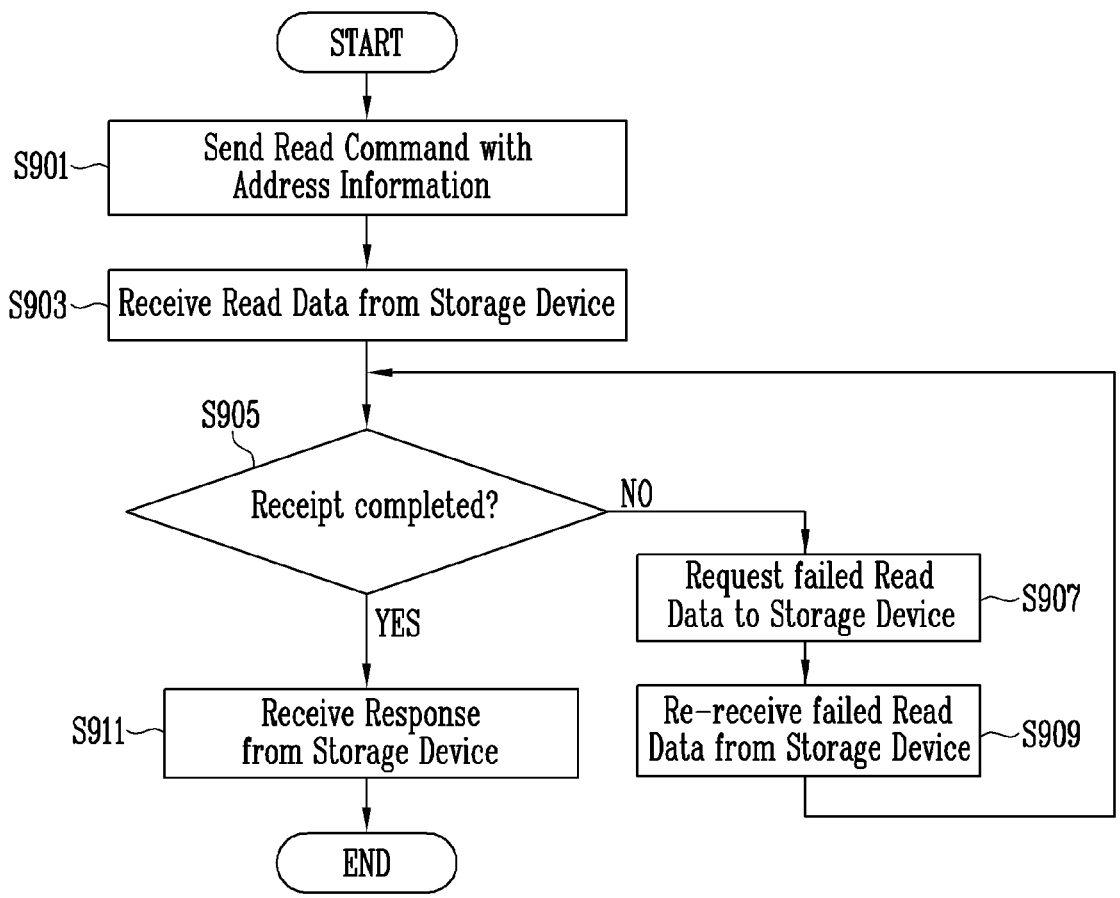
FIG. 9 is a flowchart illustrating a read operation of an electronic device from a viewpoint of the electronic device in accordance with an embodiment of the disclosed technology.

FIG. 9 is a flowchart illustrating a read operation of the electronic device from a viewpoint of the electronic device in accordance with an embodiment of the present disclosure.

Referring to FIGS. 1, 7, and 9, in step S901, the host controller 420 may provide the storage device 50 with a read command and address information in the host memory 410, which corresponds to the read command.

In step S903, the host device 400 may receive read data from the storage device 50. The step S903 may be performed using a method in which the host controller 420 stores the read data in the host memory 410 according to a request of the storage device 50 or a method in which the storage device 50 directly accesses the host memory 410, thereby storing the read data in the host memory 410.

When the host memory 410 does not completely receive the read data, but storage of a portion of the read data in the host memory 410 fails in step S905, in step S907, the host controller 420 may request failed read data from the storage device 50. Alternatively, the storage device 50 may autonomously recognize that storage of partial data in the host memory 410 has failed, without any request of the host controller 420. Accordingly, in step S909, the host memory 410 may receive the failed read data from the storage device 50.

When the host memory 410 completely receives all the read data in the step S905, in step S911, the host controller 420 may receive a response to the read data from the host memory 410.

Figure 10:
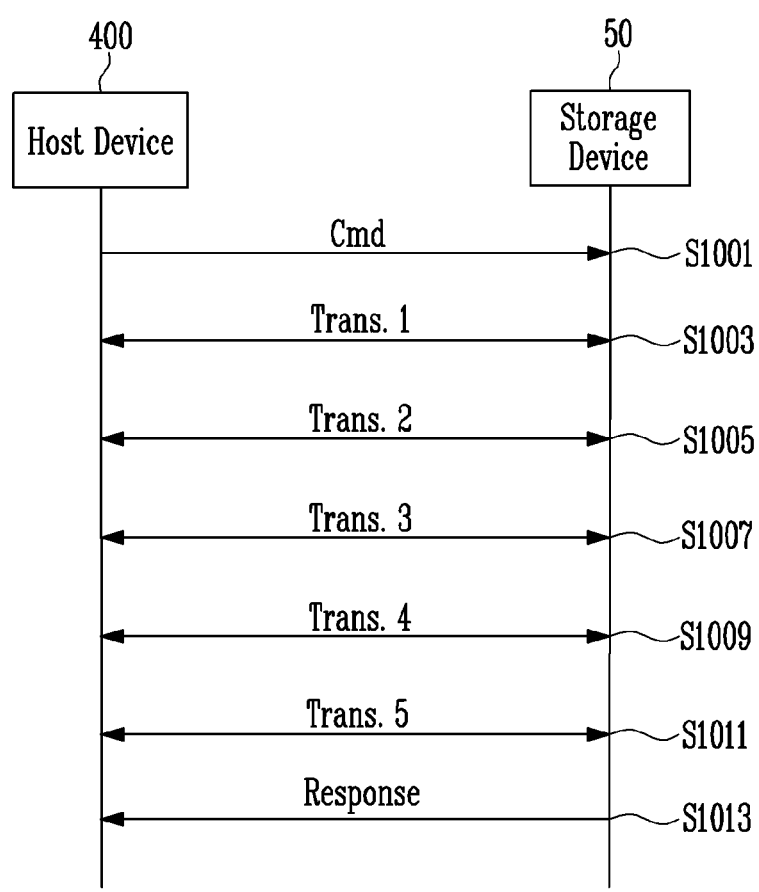
FIG. 10 is a flowchart illustrating a data transferring and receiving process of an electronic device in accordance with an embodiment of the disclosed technology.

FIG. 10 is a flowchart illustrating a data transferring/receiving process of the electronic device in accordance with an embodiment of the present disclosure.

FIG. 11 is a diagram illustrating a data transferring/receiving process of the electronic device in accordance with an embodiment of the present disclosure.

Referring to FIGS. 1, 10, and 11, the host device 400 may provide a command to the storage device in step S1001, and data transfers between the host device 400 and the storage device 50 may be performed in response to the command in steps S1003 to S1011. When all the data transfers are successfully completed, in step S1013, the storage device 50 may provide a response to the command received from the host device 400. When the command is a write command, each of TRANS. 1 to TRANS. 5 which mean data transfers may include a Ready To Transfer (RU) data packet which the storage device 50 provides to the host device 400 and a DATA OUT data packet with which the host device 400 provides data to the storage device 50. When the command is a read command, each of TRANS. 1 to TRANS. 5 which mean data transfers may include a DATA IN data packet with which the storage device 50 provides data to the host device 400.

In accordance with an example shown in FIG. 11, the command in the step S1001 shown in FIG. 10 may be a command for requesting a transfer of data including data sector 1 to data sector 16. Accordingly, in Trans. 1 of the step S1003 shown in FIG. 10, the data sector 1 to the data sector 10 may be transferred, but transfers of the data sector 4 to the data sector 7 may fail in the process. The failure of data sector transfer may mean a program fail of the memory device 100 in the case of a write operation, and mean a program fail of the host device 400 in the case of a read operation.

In Trans. 2 of the step S1005 shown in FIG. 10, the data sector 11 to the data sector 14 may be transferred, but a transfer of the data sector 12 may fail in this process. In Trans. 3 of the step S1007 shown in FIG. 10, the data sector 15 and the data sector 16 may be transferred, but a transfer of the data sector 16 may fail in this process.

Subsequently, in Trans. 4 of the step S1009 shown in FIG. 10, the data sector 4 to the data sector 7, the data sector 12, and the data sector 16, which have transfer-failed in the previous steps, may be transferred, but a transfer of the data sector 6 may fail in the process. Accordingly, in Trans. 5 of the step S1011 shown in FIG. 10, the data sector 6 may be transferred, and as a result, the transfers of the data sector 1 to the data sector 16, which are requested by the command, may all be completed. When the transfers of the data sectors, which are requested by the command, are all completed, the storage device 50 may provide a response to the command received from the host device 400 in the step S1013 shown in FIG. 10.

When transfers of some data sectors fail during a transfer of data including a plurality of data sectors, transfers of all the data sectors are not to be performed, but only data sectors of which transfers fail may be transferred. Although a case where transfers of the data sector 1 to the data sector 16 are all performed, and then transfers of failed data sectors are performed is illustrated in FIG. 10, the present disclosure is not limited to the above-described order.

Figure 12:
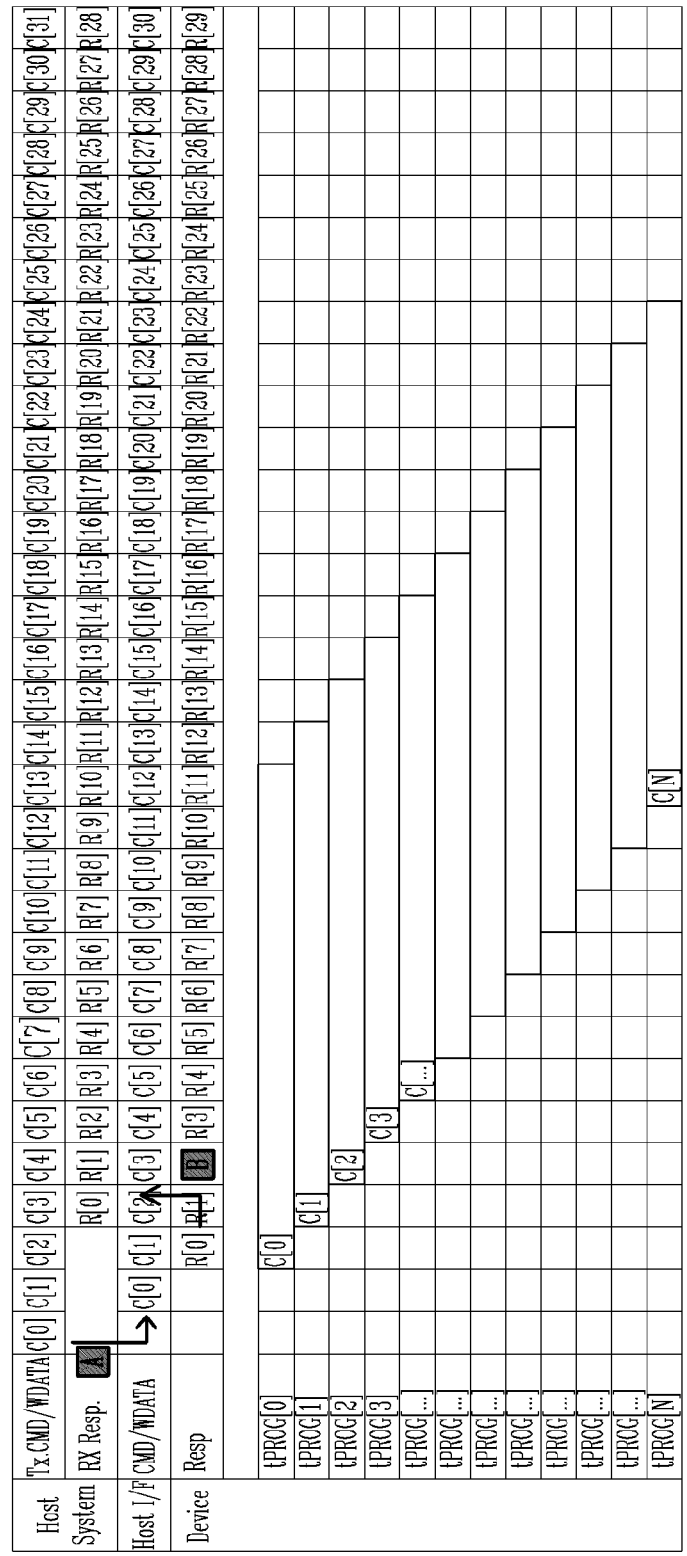
FIG. 12 is a diagram illustrating a response providing time of a conventional electronic device.

FIG. 12 is a diagram illustrating a response providing time of a conventional electronic device.

Figure 13:
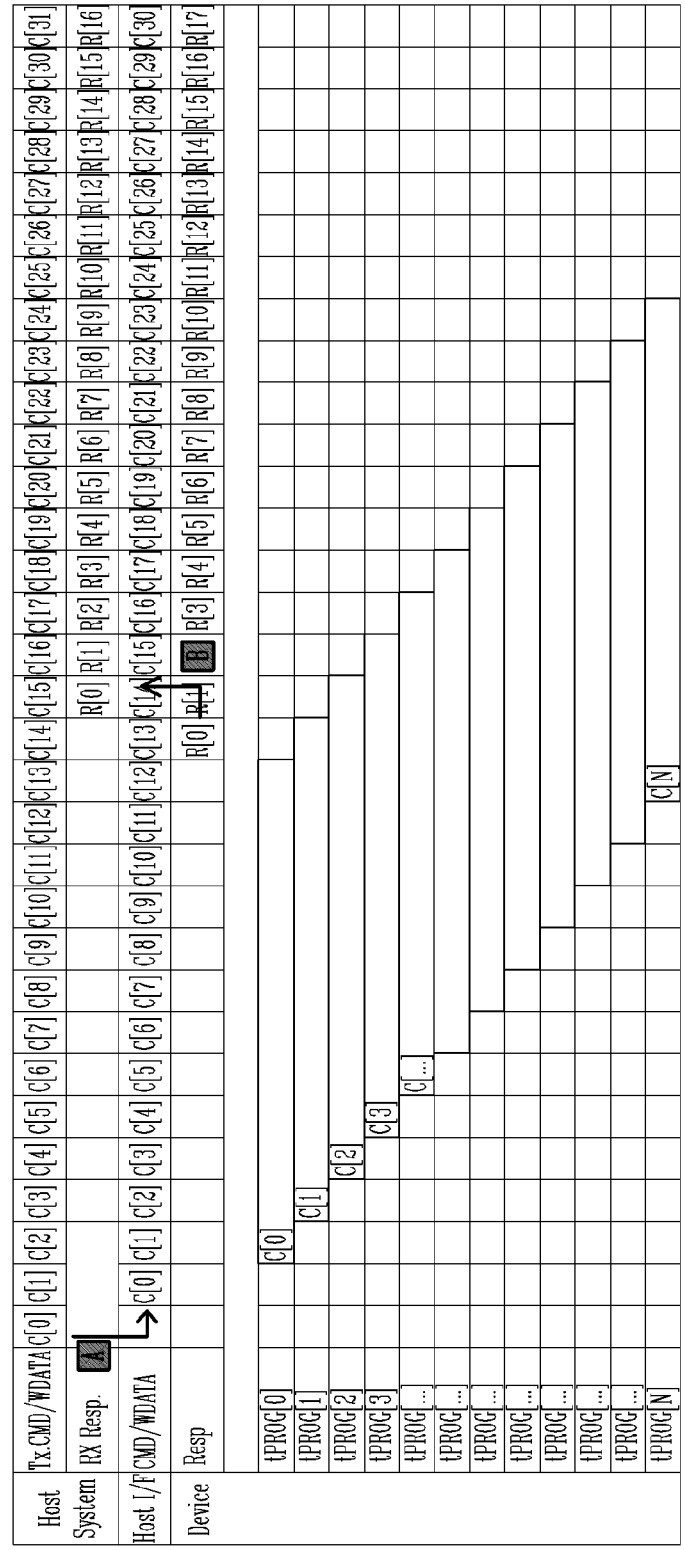
FIG. 13 is a diagram illustrating a response providing time of an electronic device in accordance with an embodiment of the disclosed technology.

FIG. 13 is a diagram illustrating a response providing time of the electronic device in accordance with an embodiment of the present disclosure.

Referring to FIGS. 1, 2, and 12, when the host interface 210 completely receive a write command and write data from the host device 400 (A), the storage device 50 may provide a response to the host device 400 (B). Accordingly, before the write data is completely programmed in the memory device 100, the response may be provided to the host device 400. When the host device 400 receives the response from the storage device 50, data stored in the host device 400 may be erased.

However, as described above, when the data stored in the host device 400 is erased before the write data is completely programmed in the memory device 100, failed data cannot be acquired when programming of some data among the data fails in the memory device 100. In this case, the storage device 50 needs to receive all the data again, which causes a problem.

When the storage device 50 has a buffer memory therein, and the buffer memory is used as a write buffer capable of temporarily storing write data, the storage device 50 does not need to receive all the data again even when the data stored in the host device 400 is erased before the write data is completely programmed in the memory device 100. However, a high-capacity buffer memory is required for the purpose of the performance of the storage device, and the performance of the storage device may be poor when the capacity of the buffer memory is small.

Referring to FIGS. 1, 2, and 13, although the host interface 210 completely receive a write command and write data from the host device 400 (A), the storage device 50 may not immediately provide a response to the host device 400. After the received write data is completely programmed, the storage device 50 may provide the response to the host device 400 (B). When the host device 400 receives the response from the storage device 50, data stored in the host device 400 may be erased. Thus, when programming of some data among the data fails in the memory device 100, the storage device 50 can acquire failed data from the host device 400.

Figure 14:
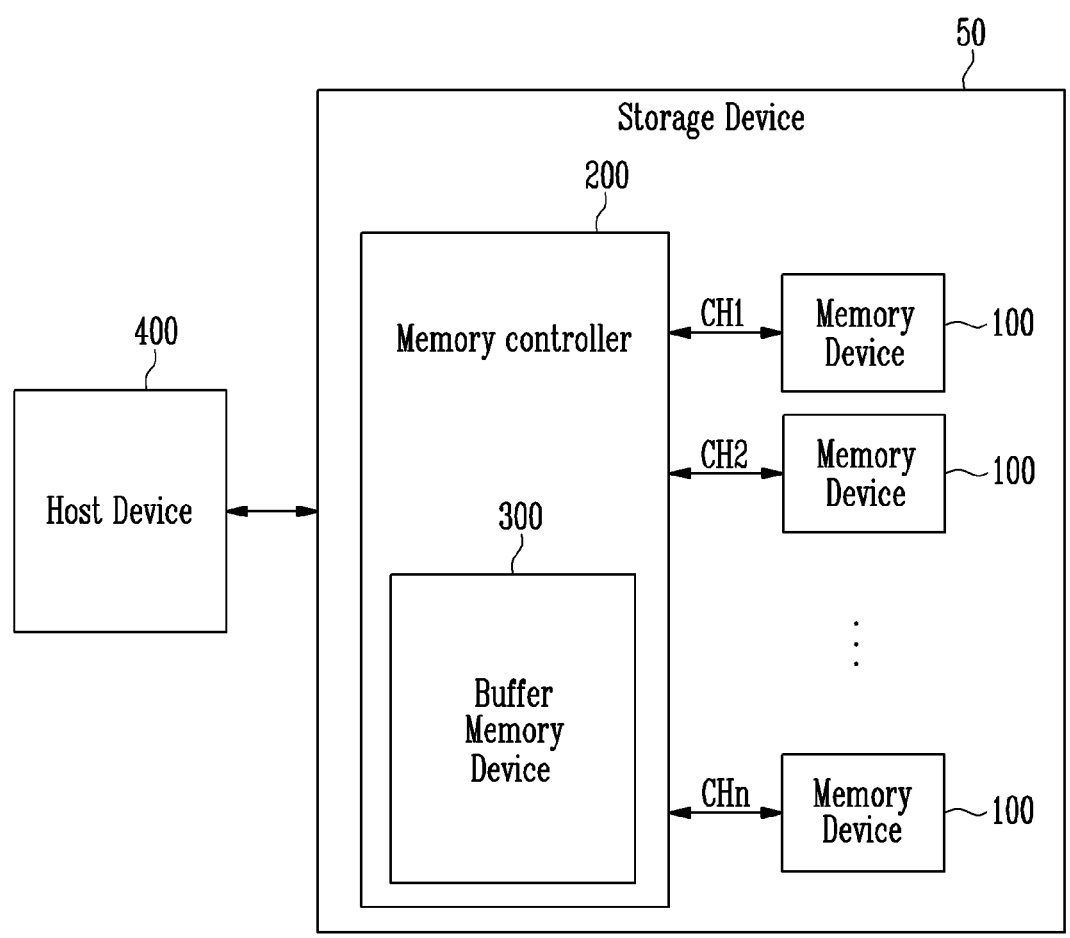
FIG. 14 is a diagram illustrating a conventional electronic device.

FIG. 14 is a diagram illustrating a conventional electronic device.

Figure 15:
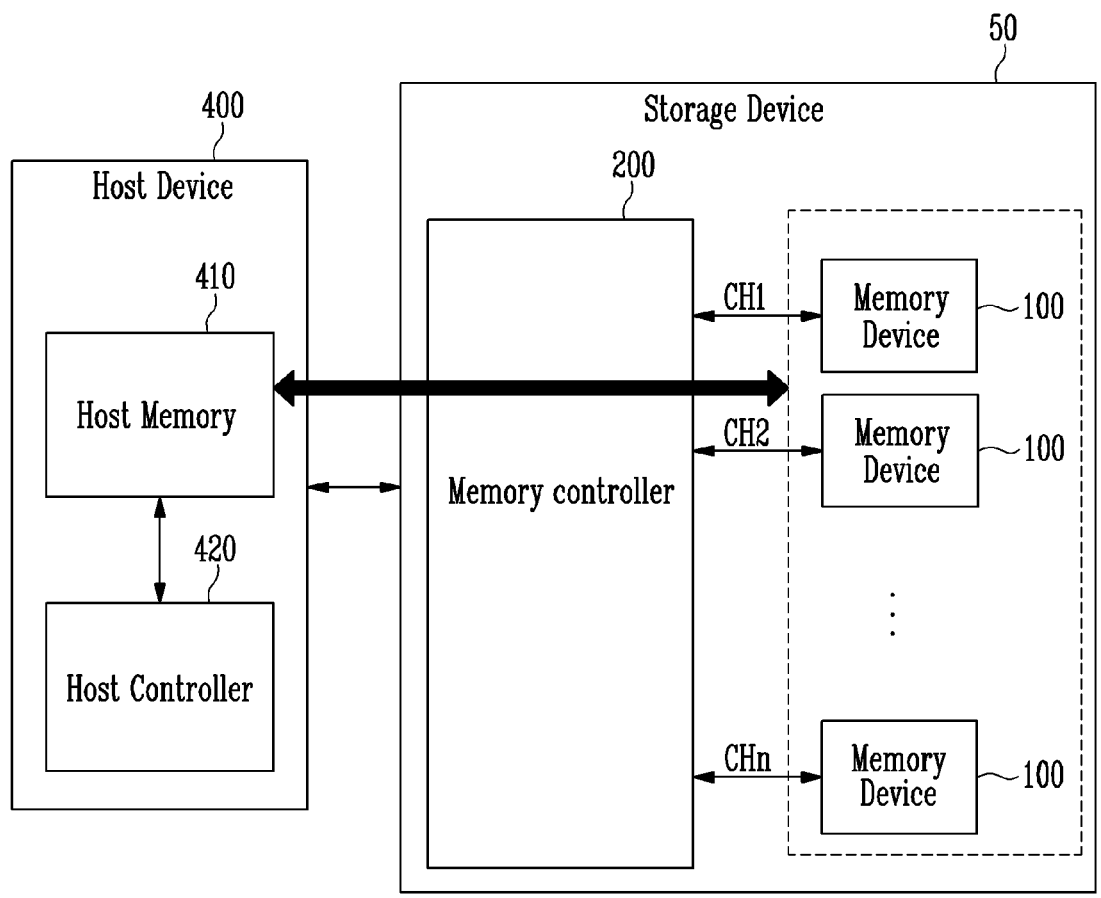
FIG. 15 is a diagram illustrating an electronic device in accordance with another embodiment of the disclosed technology.

FIG. 15 is a diagram illustrating another embodiment of the electronic device shown in FIG. 1.

Referring to FIG. 14, an electronic device may include a storage device 50 and a host device 400, and the storage device 50 may include a plurality of memory devices 100 and a memory controller 200.

The plurality of memory devices 100 may communicate with the memory controller 200 respectively through a plurality of channels.

The memory controller 200 may include a buffer memory device 300. Although a case where the buffer memory device 300 is included in the memory controller 200 has been illustrated in FIG. 14, the buffer memory controller 300 may be located at an outside of the memory controller 200.

The buffer memory device 300 may temporarily store data transferred in a write operation or a read operation. For example, write data which the storage device 50 receives from the host device 400 so as to perform the write operation may be temporarily stored in the buffer memory device 300 before the write data is provided to the memory devices 100. Data read from the memory device 100 so as to perform the read operation may be temporarily stored in the buffer memory device 300 before the data is provided to the host device 400.

The plurality memory devices 100 are connected to a plurality of channels, CH1 to CHn, so that operations on the memory devices 100 can be simultaneously performed. However, this may be actually limited to the capacity range of the buffer memory device 300. For example, when the write operation is performed, the range in which write data can be simultaneously programmed in the memory devices 100 is limited to the capacity range in which data can be stored in the buffer memory device 300 at a time. In addition, in the read operation, the range in which read data can be simultaneously read from the memory devices 100 is limited to the capacity range in which data can be stored in the buffer memory device 300 at a time.

Therefore, the buffer memory device having a larger capacity is required so as to achieve performance improvement of the storage device 50. However, the buffer memory device 300 which can be included in the storage device 50 has many limitations, and therefore, the performance improvement according to the capacity expansion of the buffer memory device 300 is limited.

Referring to FIG. 15, an electronic device may include a storage device 50 and the host device 400, the storage device 50 may include a plurality of memory devices 100 and a memory controller 200, and the host device 400 may include a host memory 410 and a host controller 420. The plurality of memory devices 100 may communicate with the memory controller 200 respectively through a plurality of channels.

In FIG. 15, a partial area of the host memory 410 may be used as a buffer memory in which data transferred in a write operation or a read operation can be temporarily stored. For example, write data which the storage device 50 receives from the host device 400 so as to perform the write operation may be temporarily stored in the host device 410 before the write data is provided to the memory devices 100. Data read from the memory device 100 so as to perform the read operation may be temporarily stored in the host memory 410.

Write data stored in the host memory 410 used as the buffer memory may be simultaneously programmed in the plurality of memory devices 100 through a plurality of channel CH1 to CHn. Data respectively read from the plurality of memory devices 100 may be simultaneously provided to the host memory 410 used as the buffer memory through the plurality of channels, CH1 to CHn.

Thus, the host memory 410 in the host device 400, which has a relatively small spatial limitation and is easily upgraded, is used as the buffer memory, so that a buffer memory having a relatively large capacity can be secured. As a result, operations on the memory devices 100, of which number corresponds to the number of the memory devices 100 or the number of the channels, CH1 to CHn, which are connected to the memory devices 100, can be simultaneously performed.

Figure 16:
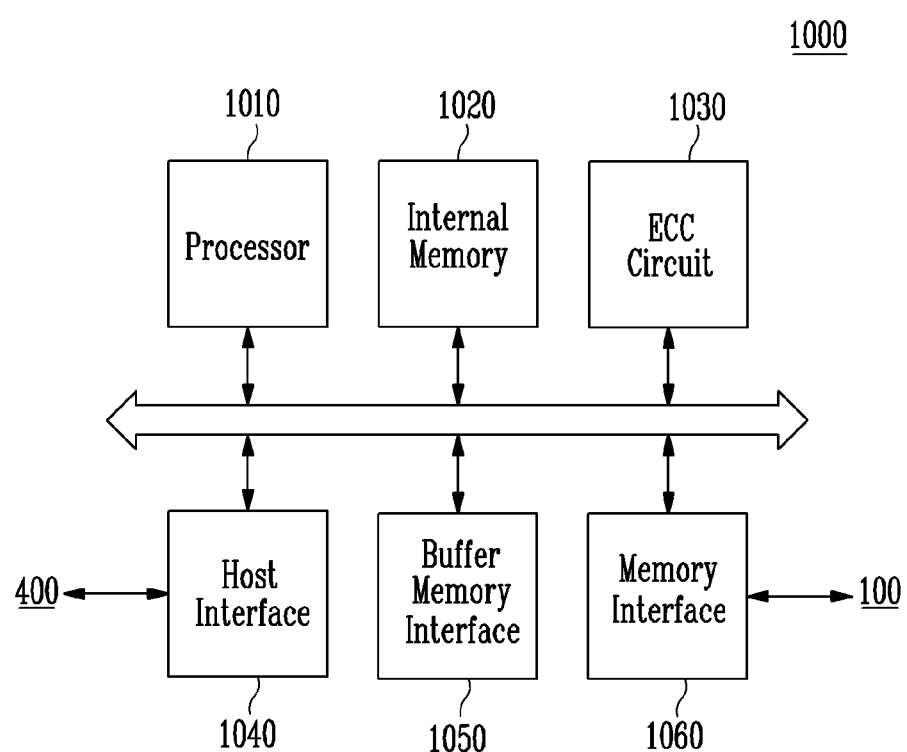
FIG. 16 is a diagram illustrating another embodiment of a memory controller shown in FIG. 1.

FIG. 16 is a diagram illustrating another embodiment of the memory controller shown in FIG. 1.

Referring to FIG. 16, a memory controller 1000 may include a processor 1010, an internal memory 1020, an Error Correction Code (ECC) circuit 1030, a host interface 1040, a buffer memory interface 1050, and a memory interface 1060.

The processor 1010 may perform various operations for controlling the memory device 100, or generate various commands. When the processor 1010 receives a request from the host device 400, the processor 1010 may generate a command according to the received request, and transfer the generated command to a queue controller (not shown).

The internal memory 1020 may store various information necessary for an operation of the memory controller 1000. For example, the internal memory 1020 may include logical and physical address map tables. The internal memory 1020 may be configured with at least one of a Random Access Memory (RAM), a Dynamic RAM (DRAM), a Static RAM (SRAM), a cache, and a Tightly Coupled Memory (TCM).

The ECC circuit 1030 may be configured to detect and correct an error of data received from the memory device 100 by using an ECC. The processor 1010 may adjust a read voltage according to an error detection result of the ECC circuit 1030, and control the memory device 100 to perform reading. In an exemplary embodiment, an error correction block may be provided as a component of the memory controller 1000.

The host interface 1040 may exchange a command, an address, data, and the like between the memory controller 1000 and the host device 400. For example, the host interface 1040 may receive a request, an address, data, and the like from the host device 400, and output data read from the memory device 100 to the host device 400. The host interface 1040 may also receive address information in the host device 400 from the host device 400. In an embodiment, the host interface 1040 may receive, from the host device 400, address information in the host device 400, at which write data is stored, and receive the write data from the host device 400, based on the address information. In an embodiment, the host interface 1040 may receive, from the host device 400, address information in the host device 400, at which read data is to be stored, and provide read data read from the memory device 100 to the host device 400, based on the address information. The host interface 1040 may communicate with the host device 400 by using various protocols.

The buffer memory interface 1050 may transfer data between the processor 1010 and a buffer memory. The buffer memory may be used as a working memory or a cache memory of the memory controller 1000, and store data used in the storage device 50. By the processor 1010, the buffer memory interface 1050 may use the buffer memory as a read buffer, a write buffer, a map buffer, or the like. In some embodiments, the buffer memory may include a Double Data Rate Synchronous Dynamic Random Access Memory (DDR SDRAM), a DDR4 SRAM, a Low Power Double Data Rate4 (LPDDR4) SDRAM, a Graphics Double Data Rate (GDDR) SDRAM, a Low Power DDR (LPDDR), or a Rambus Dynamic Random Access Memory (RDRAM). When the buffer memory is included in the memory controller 1000, the buffer memory interface 50 may be omitted.

The memory interface 1060 may exchange a command, an address, data, and the like between the memory controller 1000 and the memory device 100. For example, the memory interface 1060 may transfer a command, an address, data, and the like to the memory device 100 through a channel, and receive data and the like from the memory device 100. In an embodiment, the memory interface 1060 may directly access the host device 400.

In accordance with the present disclosure, there can be provided a storage device and an electronic device, which can further improve the performance and power efficiency of the storage device and further reduce the area of the storage device.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. Thus, it should be apparent to those skilled in the art that various modifications can be made on the basis of the technological scope of the present disclosure.

The exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A storage device comprising:
a memory device; and
a memory controller configured to receive, from an external device having an external memory, a write command for storing a plurality of write data in the memory device and address information of an area in the external memory that corresponds to the write command, and acquire the plurality of write data from the external device based on the address information,
wherein the memory controller is further configured to:
store the plurality of write data acquired from the external device in the memory device in response to the write command; and
acquire a first portion of the plurality of write data from the external memory upon a failure of storage of the first portion of the plurality of write data in the memory device after completing storing of a second portion of the plurality of write data excluding the first portion of the plurality of write data in the memory device, store the first portion of the plurality of write data acquired from the external device in the memory device in response to the write command, and provide a response to the write command to the external device after completing storing of the second portion of the plurality of write data in the memory device.

2. The storage device of claim 1, wherein the plurality of write data includes a plurality of data sectors.

3. The storage device of claim 2, wherein the first portion of the plurality of write data corresponds to one or more data sectors among the plurality of data sectors, and the memory controller is configured to acquire the one or more data sectors from the external device.

4. The storage device of claim 3, wherein the memory controller is further configured to store the one or more data sectors in the memory device.

5. The storage device of claim 1, comprising an additional memory device.

6. The storage device of claim 5, wherein the memory controller is further configured to simultaneously store data in the memory device and the additional memory device.

7. The storage device of claim 1, wherein the address information provides information on a position at which the plurality of write data is stored in the external memory.

8. A storage device comprising:
a memory device; and
a memory controller configured to receive, from an external device having an external memory, a read command for reading a plurality of read data from the memory device and address information of an area in the external memory that corresponds to the read command, and the plurality of read data from the memory device in response to the read command,
wherein the memory controller is further configured to:
provide the plurality of read data to the external device based on the address information; and
read a first portion of the plurality of read data from the memory device upon a failure in providing the first portion of the plurality of read data to the external device after completing providing of a second portion of the plurality of read data excluding the first portion of the plurality of read data to the external device, provide the first portion of the plurality of read data read from the memory device to the external device in response to the read command, and provide a response to the read command to the external device after completing providing of the second portion of the plurality of read data to the external device.

9. The storage device of claim 8, wherein the plurality of read data includes a plurality of data sectors.

10. The storage device of claim 9, wherein the first portion of the plurality of read data corresponds to one or more data sectors among the plurality of data sectors, and the memory controller is configured to read the one or more data sectors from the memory device.

11. The storage device of claim 10, wherein the memory controller is further configured to provide the one or more data sectors to the external device.

12. The storage device of claim 8, comprising an additional memory device.

13. The storage device of claim 12, wherein the memory controller is further configured to simultaneously read data from the memory device and the additional memory device.

14. The storage device of claim 8, wherein the address information provides information on a position at which the plurality of read data is to be stored in the external memory device.

* * * * *